United States Patent [19]

Shikanai

[11] Patent Number: 5,111,797
[45] Date of Patent: May 12, 1992

[54] PROCESS AND DEVICE FOR IMPROVING COMBUSTION EFFICIENCY OF A COMBUSTION MACHINE

[75] Inventor: Yasushi Shikanai, 5-11, Asahimachi, Mutsu-shi, Aomori-ken, Japan

[73] Assignees: Yasushi Shikanai; Toho Seisakusho Co., Ltd.; Japan International Development Organization Ltd., all of Japan

[21] Appl. No.: 621,062

[22] Filed: Dec. 3, 1990

[51] Int. Cl.$^5$ .............................. F02M 33/00
[52] U.S. Cl. ...................... 123/539; 123/537
[58] Field of Search ................. 123/539, 536, 537

[56] References Cited

U.S. PATENT DOCUMENTS

| | | | |
|---|---|---|---|
| 3,678,908 | 7/1972 | Ito | 123/539 |
| 4,043,308 | 8/1977 | Cerkanowicz | 123/536 |
| 4,195,606 | 4/1980 | Wallis et al. | 123/539 |

Primary Examiner—Andrew M. Dolinar
Assistant Examiner—M. Macy
Attorney, Agent, or Firm—Leydig, Voit & Mayer

[57] ABSTRACT

A device for improving combustion efficiency of an internal combustion engine includes an elongated flexible sheet, a flexible metallic reflector attached to the flexible sheet for reflecting the extreme infra-red radiation, a ceramic radiation source attached to the reflector and a fastener for attaching the flexible sheet to an air intake duct of the engine with the radiation source facing toward the duct. The extreme infra-red radiation having a wavelength of from 8 $\mu$m to 10 $\mu$m irradiates the air incoming through the duct before combustion within the engine combustion chamber, whereby the combustion efficiency of the internal combustion engine is improved.

10 Claims, 2 Drawing Sheets

PROCESS AND DEVICE FOR IMPROVING COMBUSTION EFFICIENCY OF A COMBUSTION MACHINE

BACKGROUND OF THE INVENTION

This invention relates to improvements in combustion efficiency of a combustion machine such as an internal combustion engine and more particularly to a process and a device for improving combustion efficiency of a combustion machine.

In order to improve combustion efficiency of the internal combustion engine, various attempts have been made. One example of such attempts is disclosed in Japanese Pat. No. 1,172,559, in which a pair of permanent magnets or low-power magnets are attached to a duct through which combustion air and/or fuel are introduced into a combustion chamber of an internal combustion engine. According to this patent, the magnetic field generated by the magnets affects the incoming air and improves the combustion efficiency of the engine. However, it has been found that the body of the engine made of a magnetic material is magnetized by the magnets, and the amount of generation of $CO_2$, $NO_x$ and soot is increased rather than decreased.

SUMMARY OF THE INVENTION

Accordingly, one object of the present invention is to provide a process for improving combustion efficiency of a combustion machine such as an internal combustion engine which is simple and efficient.

Another object of the present invention is to provide a device for improving combustion efficiency of a combustion machine which is simple in structure.

Another object of the present invention is to provide a device for improving combustion efficiency of a combustion machine which is efficient.

Still another object of the present invention is to provide a device for improving combustion efficiency of an internal combustion engine which is easily applicable to an engine already mounted to a vehicle.

With the above objects in view, according to the present invention, the process for improving combustion efficiency of a combustion machine comprises the step of preparing a radiation source of extreme infra-red radiation having a wavelength of from 8 $\mu$m to 10 $\mu$m. This radiation source is placed in the vicinity of a duct through which air or an air-fuel mixture is introduced into the combustion chamber so that the air or the mixture incoming through the duct is irradiated by the extreme infra-red radiation before combustion within the combustion chamber, whereby the combustion efficiency of the combustion machine is improved.

According to another aspect of the present invention, the device for improving combustion efficiency of a combustion machine having a duct comprises a radiation source of extreme infra-red radiation having a wavelength of from 8 $\mu$m to 10 $\mu$m. This radiation source of extreme infra-red radiation is positioned by a support member in the vicinity of a duct through which air or an air-fuel mixture is introduced into the combustion chamber so that the air incoming through the duct is irradiated by the extreme infra-red radiation before combustion within the combustion chamber.

The device for improving combustion efficiency of a combustion machine having a duct for introducing air into a combustion chamber may comprise a flexible sheet, and a flexible metallic reflector attached to the flexible sheet for reflecting the extreme infra-red radiation. A ceramic radiation source of extreme infra-red radiation having a wavelength of from 8 $\mu$m to 10 $\mu$m is attached to the reflector, and a fastener is attached to the flexible sheet for attaching the flexible sheet to the duct with the radiation source facing toward the duct so that the air incoming through the duct is irradiated by the extreme infra-red radiation before combustion within the combustion chamber, whereby the combustion efficiency of the combustion machine is improved.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENT

Figure 1:
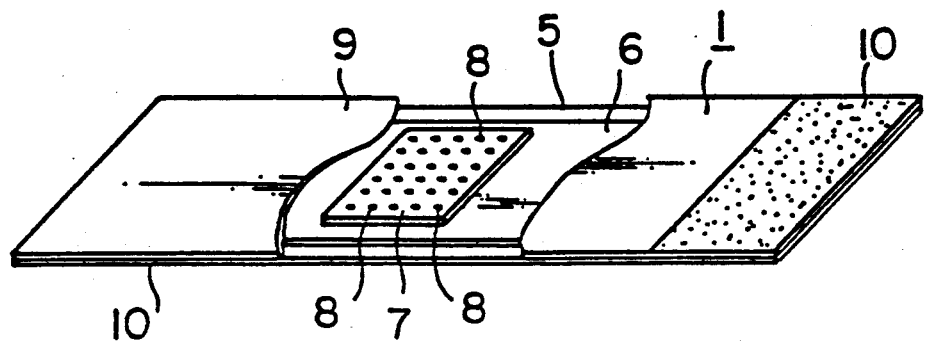
FIG. 1 is a schematic perspective view of the device for improving combustion efficiency of the present invention.
Figure 2:
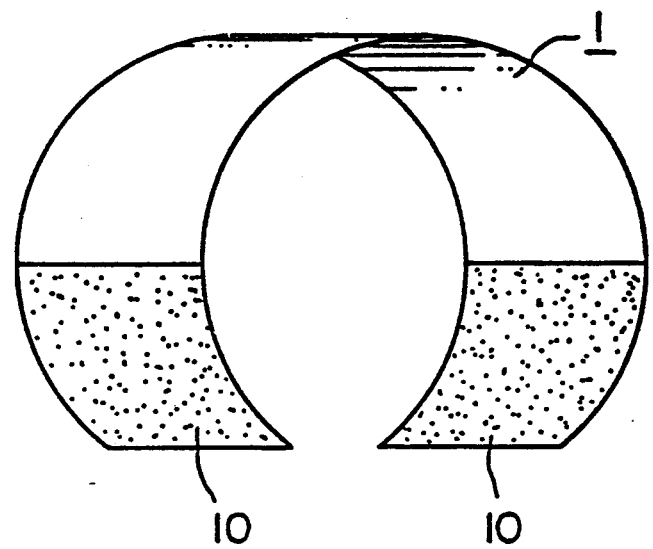
FIG. 2 is a schematic perspective view of the device for improving combustion efficiency illustrated in FIG. 1 but in a bent state.
Figure 3:
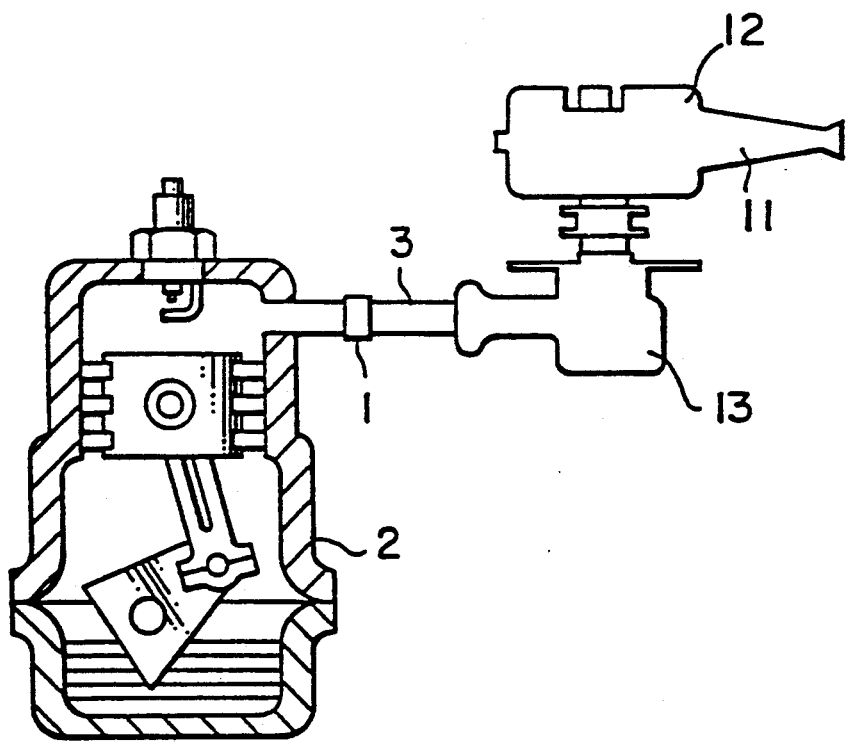
FIG. 3 is a schematic side view of an internal combustion engine to which the device for improving combustion efficiency of the present invention is applied.

FIGS. 1 to 3 illustrate one embodiment of a combustion improving device 1 of the present invention for improving combustion efficiency of a combustion machine such as an internal combustion engine 2 (FIG. 3) and a burner. The internal combustion engine 2 to be used with the device 1 of the present invention has a duct 3 through which air is introduced into a combustion chamber 4 of the engine 2.

The combustion improving device 1 comprises an elongated flexible base sheet 5 made of a suitable plastic material which preferably may be refractory. The base sheet 5 has attached thereto a flexible metallic reflector 6 for reflecting an extreme infra-red radiation. The reflector 6 may be a light-reflective aluminum foil.

Attached on the reflector 6 by a layer 7 of a bonding agent are a plurality of radiation sources 8 in the form of ceramic pellets for producing infra-red radiation, which may preferably have a wave length of from 8 $\mu$m to 10 $\mu$m. The radiation source 8 is made of a ceramic material composed of 50% - 60% alumina, 20% - 30% iron oxide, 10% - 20% titanium oxide and 3% - 7% impurities. In the preferred embodiment, the ceramic material is composed of 55% of alumina, 25% of iron oxide, 15% of titanium oxide and 5% of impurities.

The reflector 6, the bonding agent layer 7 and the radiation sources 8 are covered by a protective sheet 9 attached to the base sheet 5. The protective sheet 9 is also flexible and is transparent to the extreme infra-red radiation.

The combustion improving device 1 also comprises a fastener 10 attached to the flexible base sheet 5 for attaching the flexible base sheet 5 to the duct 3 with the radiation source 8 facing toward the duct 3 so that the air incoming through the duct 3 into the combustion chamber 4 is irradiated by the extreme infra-red radiation before combustion within the combustion chamber 4. It is preferable that the fastener 10 allow the combustion improving device 1 to be easily detachably attached to the duct 3. Accordingly, the fastener 10 of the preferred embodiment is a magic tape or a Velcro fastener (Trade Name) which is a pair of pieces of tape on which a large number of small nylon hooks and loops are planted so that, when two tapes are pressed together, the hooks and the loops engage each other to relatively strongly connect two tapes.

The combustion improving device 1 may preferably be attached to an air-fuel mixture intake duct or an intake manifold 3 of the internal combustion engine 2 as illustrated in FIG. 3. Alternatively it may be attached to an air duct 11 of an air cleaner 12 mounted to a carburator 13. Thus, the air incoming through the duct 3 is irradiated by the extreme infra-red radiation before combustion within the combustion chamber.

While the mechanism in which the combustion efficiency is improved by irradiating combustion air with an extreme infra-red radiation is not completely understood, the experiments conducted by the inventor of the present application has clearly indicated that the combustion efficiency of an internal combustion engine with the combustion efficiency improving device of the present invention is improved as compared to the engine without the device of the present invention. The results of the tests are indicated below:

CLM5202325794 (car #1) alone and put in service on a commercial route. The same type of buses with the same type of engine (Car #2 and car #3) were operated without the combustion improving device on the same commercial route. The tests were conducted from August to October, 1988. From the tests it is clear that Car #1 with the combustion improving device of the present invention exhibited a distance per fuel consumption of 3.17 km/l whereas car #2 and car #3 exhibited the values of 2.92 km/l and 2.94 km/l, respectively.

Test 2

Table II indicates the test results of another test which was conducted by the inventor of the present invention. In the test, a same Isuzu Type CXZ19J dump truck with an Isuzu Type 10PC1 diesel engine (15,014 cc) was used throughout the tests to obtain values of km/l with and without the combustion improving device of the present invention under the non-loaded and loaded conditions with 10,450 kg sand. The tests were conducted in four 3 km test sections at different speed for each section. The average km/l was obtained for four test runs at different speed by conducting four test runs on a straight 12 km test road having four sections of 3 km length each.

TABLE II

| Load | Comb. Effcy Imprv. Device | Sec. I 50 km/h | Sec. II 60 km/h | Sec. III 70 km/h | Sec. IV 80 km/h | Average km/l |
|---|---|---|---|---|---|---|
| No Load | Without (km/l) | 4.1 | 3.61 | 3.03 | 3.03 | 3.44 |
|  | With (km/l) | 9.09 | 6.25 | 4.76 | 3.19 | 5.82 |
| Loaded | Without (km/l) | 3.22 | 2.72 | 2.32 | 1.80 | 2.52 |
|  | With (km/l) | 3.33 | 2.83 | 2.40 | 2.36 | 2.74 |

Test 1

TABLE I

| CAR #1 (with) | August | Sept. | October | Total | Mean Val |
|---|---|---|---|---|---|
| Distance (km) | 5,159 | 3,209 | 4,765 | 12,953 | 4,318 |
| Fuel Consumption (l) | 1,404 | 1,018 | 1,649 | 4,071 | 1,357 |
| Dist./Fuel Con. (km/l) | 3.67 | 2.97 | 2.88 | 9.52 | 3.17 |

| CAR #2 (without) | August | Sept. | October | Total | Mean Val |
|---|---|---|---|---|---|
| Distance (km) | 4,903 | 3,952 | 5,309 | 14,164 | 4,721 |
| Fuel Consumption (l) | 1,666 | 1,361 | 1,818 | 4,845 | 1,615 |
| Dist./Fuel Con. (km/l) | 2.94 | 2.90 | 2.92 | 8.76 | 2.92 |

| CAR #3 (without) | August | Sept. | October | Total | Mean Val |
|---|---|---|---|---|---|
| Distance (km) | 3,348 | 4,139 | 5,259 | 12,746 | 4,249 |
| Fuel Consumption (l) | 1,159 | 1,464 | 1,715 | 4,338 | 1,446 |
| Dist./Fuel Con. (km/l) | 2.88 | 2.82 | 3.06 | 8.76 | 2.94 |

Table I indicates the results of a comparison test in which three buses in commercial service by JR Bus Tohoku Kabushiki Kaisha (former Japanese National Railways) are used. The combustion improving device as illustrated in FIGS. 1 to 3 was wound around the fuel-air mixture intake manifold of the Isuzu Type DH100H diesel engine used in Isuzu Type Test 3

In a still another test, Honda passenger car Type EGA1 with an engine Type D12A was used to obtain data of the 10 mode exhaust gas test on CO, HC, NOx, $CO_2$ and distance/fuel consumption with and without the combustion improving device of the present invention. The test was conducted by driving the car at ten prescribed different operating modes to cover 15 km by ADI Automotive Exhaust Gas Laboratory at Kanagawa, Japan. Table III indicates the test results.

TABLE III

|  | CO | HC | NOx | $CO_2$ | km/l |
|---|---|---|---|---|---|
| Without | 70.0 ppm | 10.2 ppmc | 21.0 ppm | 0.48% | 15.64 km/l |
| With | 70.0 ppm | 9.8 ppmc | 18.0 ppm | 0.452% | 17.68 km/l |
| Change % | 0% → | 4.08% ↓ | 16.67% ↓ | 6.19% ↓ | 13.04% ↑ |

As has been described above, according to the present invention, the process for improving combustion efficiency of a combustion machine comprises the step of preparing a radiation source of extreme infra-red radiation having a wavelength of from 8 μm to 10 μm, and the radiation source is placed in the vicinity of a duct through which air or an air-fuel mixture is introduced into the combustion chamber so that the air or the mixture incoming through the duct is irradiated by the extreme infra-red radiation before combustion within the combustion chamber. According to the combustion efficiency improving device of the present invention for improving combustion efficiency of a combustion machine having a duct, a radiation source of extreme infra-red radiation having a wavelength of from 8 μm to 10 μm can be positioned by a support member in the vicinity of a duct through which air or an air-fuel mixture is introduced into the combustion chamber so that the air incoming through the duct is irradiated by the extreme infrared radiation before combustion within the combustion chamber. Therefore, the combustion efficiency of the combustion machine such as an internal combustion engine is improved.

Also, according to the present invention, the device for improving combustion efficiency of a combustion machine having a duct for introducing air into a combustion chamber may comprise a flexible sheet, and a flexible metallic reflector attached to the flexible sheet for reflecting the extreme infra-red radiation. A ceramic radiation source of extreme infra-red radiation having a wavelength of from 8 $\mu$m to 10 $\mu$m is attached to the reflector, and a fastener is attached to the flexible sheet for attaching the flexible sheet to the duct with the radiation source facing toward the duct so that the air incoming through the duct is irradiated by the extreme infra-red radiation before combustion within the combustion chamber. Therefore, the combustion efficiency of the combustion machine can be improved with a simple and efficient device which can easily be applied to an engine already mounted in a vehicle.

What is claimed is:

1. A process for improving combustion efficiency of a combustion machine having a duct for introducing air into a combustion chamber, comprising the steps of:
    preparing a source of extreme infra-red radiation having a wavelength of from 8 $\mu$m to 10 $\mu$m; and
    placing said source of extreme infra-red radiation in the vicinity of said duct so that the air incoming through said duct is irradiated by said extreme infra-red radiation before combustion within the combustion chamber
    whereby the combustion efficiency of the combustion engine is improved.

2. A device for improving combustion efficiency of a combustion machine having a duct for introducing air into a combustion chamber, comprising:
    a source of extreme infra-red radiation having a wavelength of from 8 $\mu$m to 10 $\mu$m; and
    means for attaching said source of extreme infra-red radiation in the vicinity of said duct so that the air incoming through said duct is irradiated by said extreme infrared radiation before combustion within the combustion chamber
    whereby the combustion efficiency of the combustion engine is improved.

3. A device for improving combustion efficiency of an internal combustion engine having a duct for introducing air into a combustion chamber, comprising:
    a flexible sheet;
    a flexible metallic reflector attached to said flexible sheet for reflecting extreme infra-red radiation;
    a ceramic radiation source of extreme infra-red radiation attached to Said reflector; and
    fastener means attached to said flexible sheet for attaching said flexible sheet to said duct with said radiation source facing toward said duct so that the air incoming through said duct is irradiated by said extreme infra-red radiation before combustion within the combustion chamber
    whereby the combustion efficiency of the internal combustion engine is improved.

4. A device for improving combustion efficiency as claimed in claim 3, wherein said flexible sheet is an elongated sheet made of a heat resistance material.

5. A device for improving combustion efficiency as claimed in claim 3, wherein said flexible metallic reflector is an aluminum foil.

6. A device for improving combustion efficiency as claimed in claim 3, wherein said radiation source comprises a plurality of radiation sources in the form of ceramic pellets.

7. A device for improving combustion efficiency as claimed in claim 3, wherein said extreme infra-red radiation has a wavelength of from 8 $\mu$m to 10 $\mu$m.

8. A device for improving combustion efficiency as claimed in claim 3, wherein said radiation source made of a ceramic material is composed of 50% - 60% alumina, 20% - 30% iron oxide, 10% - 20% titanium oxide and 3% - 7% inmpurities.

9. A device for improving combustion efficiency as claimed in claim 3, wherein said ceramic material is composed of 55% of alumina, 25% of iron oxide, 15% of titanium oxide and 5% of impurities.

10. A device for improving combustion efficiency as claimed in claim 3, wherein said fastener comprises a pair of pieces of flexible tape on which a large number of small nylon hooks and loops are planted so that, when two tapes are pressed together, the hooks and the loops engage each other to relatively strongly connect two tapes.

* * * * *